United States Patent
Schriever et al.

(10) Patent No.: US 6,855,932 B2
(45) Date of Patent: Feb. 15, 2005

(54) DETECTOR ARRANGEMENT FOR ENERGY MEASUREMENT OF PULSED X-RAY RADIATION

(75) Inventors: Guido Schriever, Goettingen (DE); Juergen Kleinschmidt, Weissenfels (DE)

(73) Assignee: Xtreme technologies GmbH, Jena (DE)

( * ) Notice: Subject to any disclaimer, the term of this patent is extended or adjusted under 35 U.S.C. 154(b) by 138 days.

(21) Appl. No.: 10/393,930

(22) Filed: Mar. 20, 2003

(65) Prior Publication Data

US 2003/0178566 A1 Sep. 25, 2003

(30) Foreign Application Priority Data

Mar. 22, 2002 (DE) .......................................... 102 13 482

(51) Int. Cl.$^7$ ................................................. G01J 5/00
(52) U.S. Cl. ..................................... 250/336.1; 250/372
(58) Field of Search ............................... 250/336.1, 372

(56) References Cited

U.S. PATENT DOCUMENTS

2003/0190012 A1 * 10/2003 Ahmad ....................... 378/119
2003/0201737 A1 * 10/2003 Kleinschmidt ............... 315/291
2004/0099808 A1 *  5/2004 Berger ......................... 250/372
2004/0129896 A1 *  7/2004 Schmidt et al. ........... 250/492.2
2004/0141578 A1 *  7/2004 Enfinger ...................... 376/100

* cited by examiner

Primary Examiner—David Porta
Assistant Examiner—Christine Sung
(74) Attorney, Agent, or Firm—Reed Smith LLP

(57) ABSTRACT

The invention is directed to a detector arrangement for energy measurement of pulsed x-ray radiation, particularly for monitoring the energy emitted by pulsed EUV radiation sources. The object of the invention, to find a novel possibility for energy measurement of high-energy x-ray radiation or EUV radiation which permits an accurate monitoring of the radiation dose over the entire life of the radiation source without continual calibration of the radiation detectors, is met according to the invention in that a closed vessel is provided which has an inlet opening for the radiation to be detected, is filled with a suitable gas under defined pressure for absorbing the radiation and has a linear extension, at least in the direction of incidence of the radiation, which is adapted to the absorption behavior of the gas so that the radiation to be detected is absorbed before it can reach a wall of the vessel, and at least one pressure sensor is arranged in the vessel for measuring a pressure wave generated due to the local temperature change occurring as a result of temporary intensive radiation absorption.

14 Claims, 2 Drawing Sheets

1

DETECTOR ARRANGEMENT FOR ENERGY MEASUREMENT OF PULSED X-RAY RADIATION

CROSS-REFERENCE TO RELATED APPLICATIONS

This application claims priority of German Application No. 102 13 482.0, filed Mar. 22, 2002, the complete disclosure of which is hereby incorporated by reference.

BACKGROUND OF THE INVENTION a) Field of the Invention

The invention is directed to a detector arrangement for energy measurement of pulsed x-ray radiation, particularly for monitoring the energy emitted by pulsed EUV radiation sources.

b) Description of the Related Art

In the lithography process for semiconductor fabrication, the dose radiated into the photosensitive resist is a critical quantity. Therefore, during exposure the exact output of the radiation source must be known and must be kept constant. Photodiodes are typically used for output measurement, but they age due to the impinging radiation and their sensitivity changes. As a result, when such detectors are used for energy regulation, the EUV radiation sources show a long-term drift of the output power of the light source. In order to prevent this, regular reference measurements and recalibration are necessary or the detector must be exchanged.

The cause of this disadvantageous phenomenon in conventional semiconductor detectors is essentially that these detectors themselves absorb high-energy radiation (shortwave VUV or EUV radiation). This brings about electronic changes in the light-sensitive detector material resulting in changes in the sensitivity and response function of the detector, i.e., the detector is degraded. A radiation receiver of this type which is not stable over the long term and which does not allow absolute measurements can only be used for monitoring the radiation dose and for controlling the pulse energy of VUV radiation sources and EUV radiation sources if it is frequently recalibrated or exchanged. This process is time-consuming and reduces the long-term drift only by small amounts in short time periods.

OBJECT AND SUMMARY OF THE INVENTION

It is the primary object of the invention to find a novel possibility for energy measurement of high-energy x-ray radiation or EUV radiation which permits an accurate monitoring of the radiation dose over the entire life of the radiation source without continual calibration of the radiation detectors.

According to the invention, this object is met in a detector arrangement for energy measurement of pulsed x-ray radiation, particularly for monitoring the radiation dose of pulsed EUV radiation sources, in that a closed vessel is provided which has an inlet opening for the radiation to be detected, is filled with a suitable gas under defined pressure for absorbing the radiation and has a linear extension, at least in the direction of incidence of the radiation, which is adapted to the absorption behavior of the gas so that the radiation to be detected is absorbed before it can reach a wall of the vessel, and at least one pressure sensor is arranged in the vessel for measuring a pressure wave generated due to the local temperature change occurring as a result of temporary intensive radiation absorption.

The gas filling the vessel is advantageously adjusted with respect to type and density in such a way that the radiation to be measured is virtually completely absorbed in the gas, i.e., the product of absorption coefficient, gas density and linear dimension of the gas vessel is much greater than one.

In order to ensure reliable (comparable) measurement results, the detector arrangement advantageously has measuring devices for monitoring the gas density. A temperature sensor and an additional static pressure sensor are advisably provided for this purpose.

The gas in the vessel of the detector arrangement is advantageously a gas with an atomic number of $Z>4$ which favorably absorbs the radiation to be detected. Inert gases, preferably noble gases (such as neon, argon, krypton, etc.) are advisably used. A gas mixture comprising several gases with atomic numbers $Z>4$ can also be used.

It is advisable to use sufficiently sensitive acoustic sensors as dynamic pressure sensors for energy measurement of the pressure wave generated by the radiation which impinges in a pulsed manner. In this connection, it has proven advantageous to use one or more condenser microphones. Piezoelectric sensors are preferably used as pressure sensors for measuring pressure waves.

The pressure sensor should advisably be positioned in such a way that it is not directly irradiated by the radiation falling into the inlet opening of the vessel so as to avoid possible degradation effects from the start.

For stabilizing the absorption characteristics of the gas, it is further advantageous that the gas is exchanged by a regular, preferably continuous inflow and outflow in order to ensure identical conditions with respect to purity and density of the gas over long periods of time.

A particularly advantageous solution consists in energy measurement of pulsed EUV radiation sources based on a gas discharge because with this application xenon can be used both as gas for the energy absorption in the vessel and as work gas for plasma generation, wherein the gas pressure in the vessel of the detector arrangement should be adjusted so as to be greater than the gas pressure in the discharge chamber of the EUV radiation source. In order to prevent transmission losses, it is advantageous when the inlet opening of the vessel for the radiation is connected directly to the discharge chamber of the EUV radiation source by a connection flange and an inlet diaphragm unit limits the inlet opening in such a way that the xenon in the vessel of the detector arrangement is kept at a higher partial pressure relative to the discharge chamber by differential pumping and the vessel is accordingly a quasi-closed system according to the invention.

The basic idea of the invention consists in breaking away from conventional radiation detectors that are relatively severely degraded by the intensive irradiation by high-energy x-ray radiation in order to avoid continual recalibration. Therefore, the solution according to the invention provides a photoacoustic energy conversion. The radiation is absorbed in a gas volume that is constantly monitored and preferably continuously renewed. This prevents interaction between the high-energy radiation and the actual detector which results in an appreciably longer useful life because the detector is not degraded and the gas can be renewed as a mediator.

The invention will be described more fully in the following with reference to embodiment examples.

DESCRIPTION OF THE PREFERRED EMBODIMENTS

Figure 1:
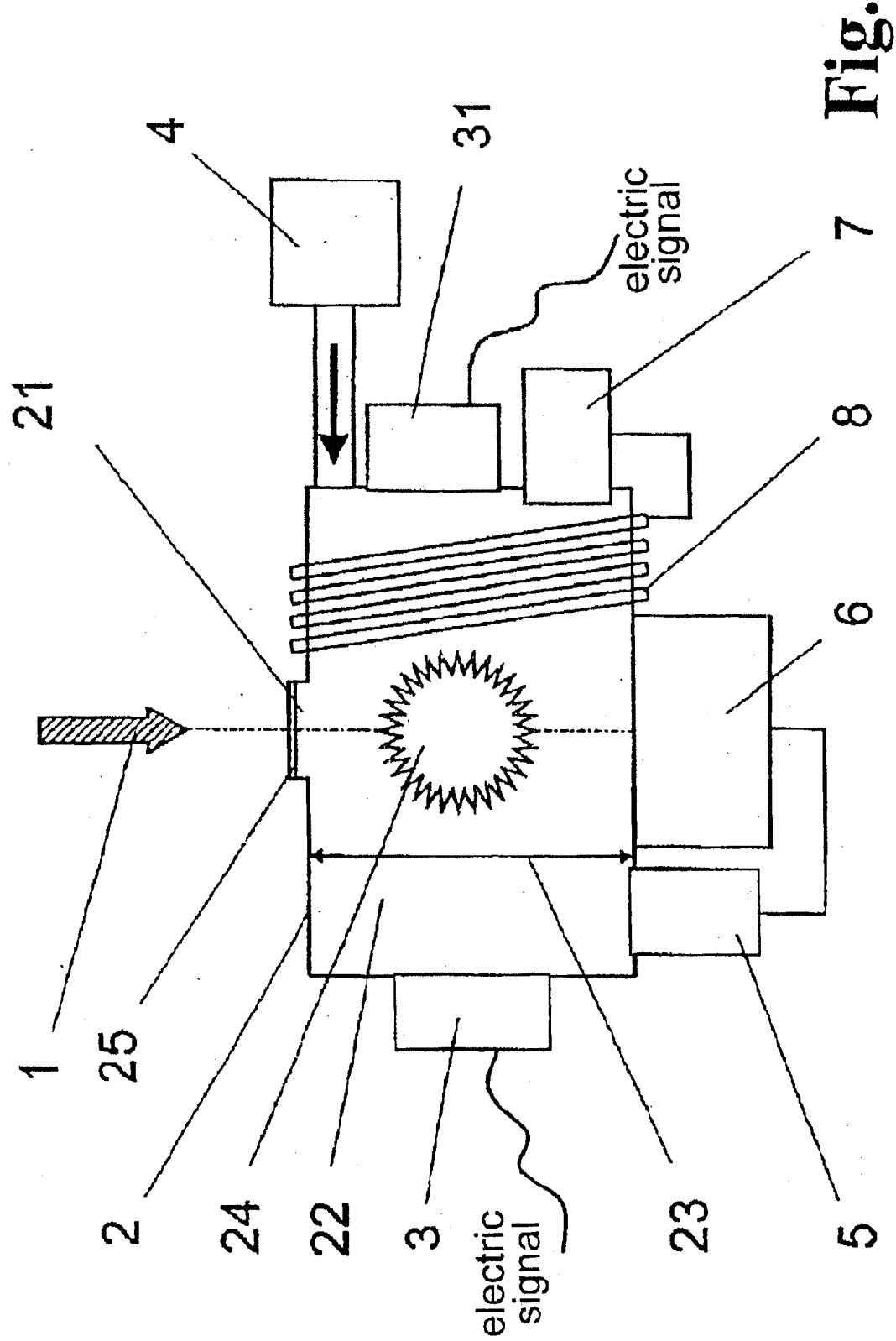
FIG. 1 shows a schematic view of a detector arrangement for pulsed x-ray radiation.

As is shown in FIG. 1, the detector arrangement for pulsed x-ray radiation basically comprises a closed vessel 2 which has an inlet opening 21 for the radiation 1 to be detected, is filled with a gas 22 that is kept at a determined pressure and has good absorption, and has a sufficient linear extension 23 in the direction of incidence of the light. The detector arrangement also comprises a dynamic pressure sensor 3 which measures the energy of the incident pulsed radiation 1 in the form of pressure waves 24 generated by energy absorption in the gas 22. The inlet opening 21 is closed by an inlet window 25 which is transparent for the radiation 1 to be detected. The inlet window 25 comprises beryllium, silicon nitride ($Si_3N_4$) or a material with similarly high transparency for the radiation 1.

The vessel 2 of the detector arrangement is filled with a gas having an atomic number Z>4 which favorably absorbs the radiation 1 to be detected. In this case, it is assumed that the gas 22 is argon. However, other inert gases, e.g., nitrogen or other noble gases such as neon, krypton, xenon, etc. or mixtures of gases can also be used. The gas 22 in the vessel 2 is kept at a constant, mean pressure in the pauses between the radiation pulses by means of a gas supply device 4 and a static pressure sensor 5. The mean pressure relates to the absorption length of the gas 22 to be adjusted by selecting the type of gas and the linear extension 23 of the vessel 2 by means of the gas pressure; the absorption length ensures that no radiation 1 reaches the rear wall of the vessel 2, if possible. On one hand, this prevents unnecessary heating of the vessel 2 and, on the other hand, the energy of every radiation pulse is converted into a pressure wave 24 as completely as possible. When adjusting the mean pressure in the vessel 2, it is advantageous that the product of gas density, absorption coefficient and linear extension of the vessel 2 (in the entry direction of the EUV radiation) must be much greater than 1.

Coefficients of absorption for the indicated gases typically range from $10^4$ to $10^6$ $cm^2/g$ for radiation of 100 eV photon energy. The absorption length and accordingly the (minimum necessary) linear extension 23 of the vessel 2 is then only a few centimeters at a typical pressure of 100 to 10000 Pa, i.e., the vessel 2 can be kept very small with respect to its dimensioning, particularly its linear dimension 23 (in the direction of the incident radiation 1).

The absorbed pulsed radiation 1 generates a pressure wave 24 in the gas phase through local, temporary heating of the gas (adiabatic change of state), which pressure wave 24 propagates on all sides in the gas volume of the vessel 2. This pressure wave 24 is converted by one or more dynamic pressure sensors 3 into an electric signal which is an equivalent for the generated pressure increase and, therefore, for the respective energy input which takes place in a pulsed manner. Condenser microphones 31 or piezoelectric sensors 32 (shown only in FIG. 2) are used as dynamic pressure sensors 3.

In order to ensure long operating periods of constant measurement conditions for the conversion of the pulse energy of the radiation 1 into a pressure wave 24, a regular gas exchange is provided on the one hand and the temperature of the gas 22 is maintained constant on the other hand.

For the exchange of gas, the gas supply device 4 is used in combination with a vacuum pump 6. A static pressure sensor 5 provides for the regulation of the gas feed and for maintaining constant the required average gas pressure (static pressure without pressure wave 24).

In order to achieve a uniform temperature of the detector arrangement, a temperature sensor 7 and a heating and cooling device 8 are arranged at the vessel 2 to counteract the heat dissipation occurring in the entire gas volume of the vessel 2 as a result of the temporary local heating taking place with the absorption of the radiation 1 or to realize a preheating of the gas at the start and during longer radiation pauses.

The two steps mentioned above provide for stable measurement conditions that are comparable continuously (also over long periods of time) for an acoustic energy measurement of the radiation 1 entering in a pulsed manner by means of a microphone 31 (as dynamic pressure sensor 3).

Figure 2:
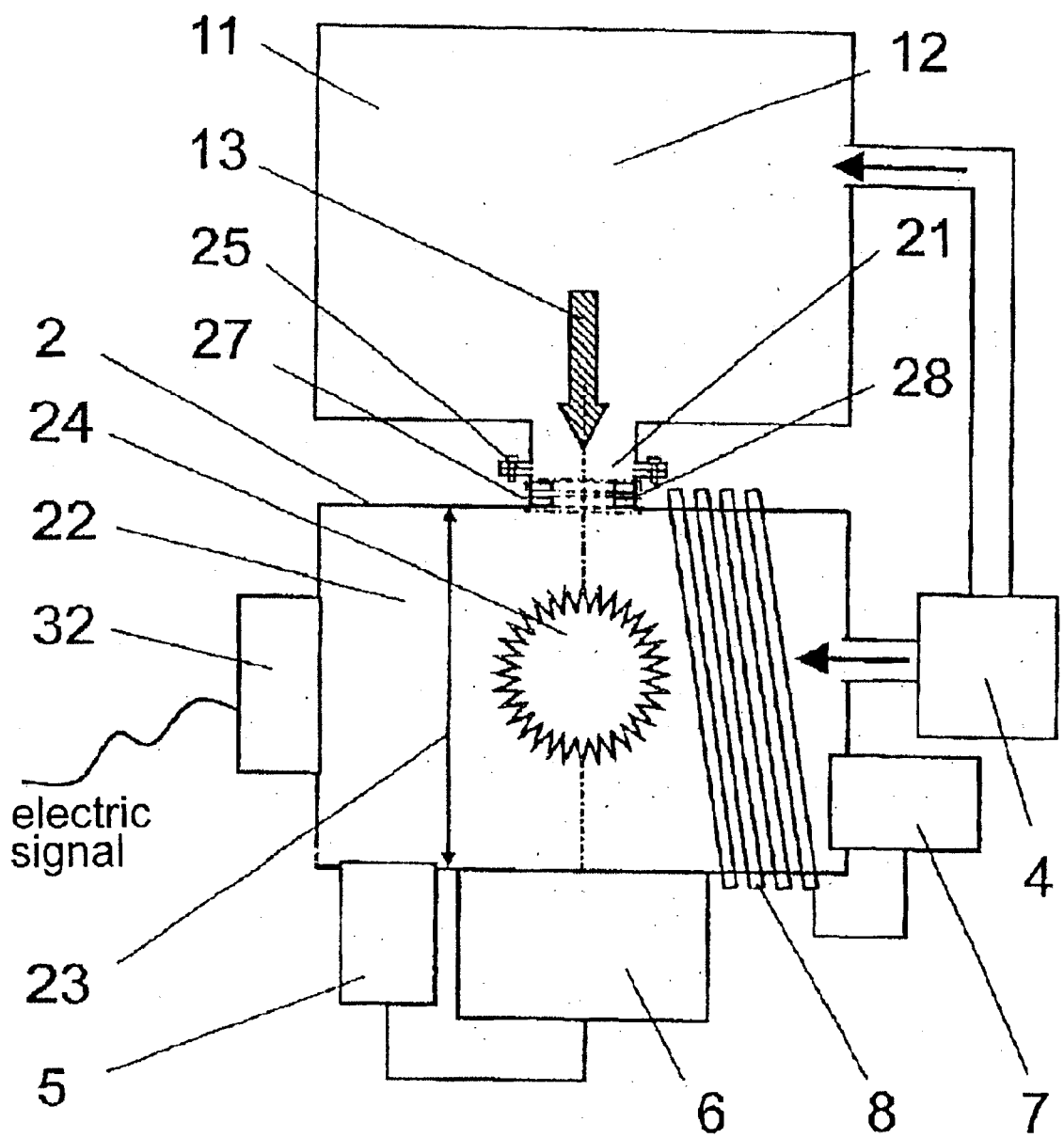
FIG. 2 shows an advantageous construction of a detector arrangement with a direct connection to a gas-discharge-coupled EUV radiation source.

FIG. 2 shows a second variant of the detector arrangement which is conceived for an EUV radiation source 11 based on a gas discharge. In this case, the gas 22 is xenon which is also used at the same time as work gas in the discharge chamber 12 of the EUV radiation source 11. In this way, essential components of the gas supply device 4 can be combined with the gas preparation of the EUV radiation source 11. The gas supply device 4 in this case is really a principal component of the EUV radiation source 11 and is used additionally by the proposed detector arrangement only in that a different gas pressure is generated for the vessel 2.

As can be seen from FIG. 2, the vessel 2 is flanged directly to the EUV radiation source 11. In contrast to the first example, the inlet opening 21 of the vessel 2 has no inlet window 25 but, instead, a connection flange 26 with an inlet diaphragm unit 27 which allows a higher partial pressure to be maintained in the vessel 2 compared to the pressure in the discharge chamber 12 of the EUV radiation source 11. The inlet diaphragm 27 contains one or more annular diaphragms 28 which hardly obstruct the incident EUV radiation 13, but present a flow resistance to the xenon which is used as gas 22. In the vessel 2, the gas 22 is renewed (i.e., continuously exchanged) by continuous influx via the gas supply device 4 and the generated gas pressure monitored by the static pressure sensor 5 and held between the radiation pulses at a constant mean pressure which satisfies the absorption condition mentioned above. Since the detector arrangement in this example is practically connected to the discharge chamber 12 of the EUV radiation source 11, the gas 22 (xenon) is pumped differentially in the vessel 2 in order to adhere to the constant mean gas pressure according to the absorption condition mentioned above. In addition to the outflow of gas 22 out of the vessel 2 which is defined by the connection flange 26 and results from the pressure gradient relative to the discharge chamber 12, a vacuum pump 5 is used for carrying out a continuous exchange of gas as in the first example.

By means of the steps mentioned above, a quasi-closed system is obtained which has improved inlet transmission for the EUV radiation 13 within the vessel 2 and which carries out the measuring job of monitoring the dose stability of the pulse energy of the EUV radiation source 11 with sufficient accuracy.

Since the detector arrangement should make it possible to monitor energy of the EUV radiation source 11 in the course of an illumination operation, the connection flange 26 is generally not arranged in the principal beam cone of the EUV radiation source 11, although this seems obvious in the schematic view in FIG. 2.

In order to maintain constant measurement conditions, the temperature is likewise monitored by a temperature sensor 7 as was already described in FIG. 1 and is maintained constant by means of the heating and cooling arrangement 8. All the rest of the functions and conditions are carried out as described in FIG. 1

While the foregoing description and drawings represent the present invention, it will be obvious to those skilled in the art that various changes may be made therein without departing from the true spirit and scope of the present invention.

Reference Numbers
1 radiation
11 EUV radiation source
12 discharge chamber
13 EUV radiation
2 vessel
21 inlet opening
22 gas
23 linear extension
24 pressure wave
25 inlet window
26 connection flange
27 inlet diaphragm unit
28 annular diaphragm
3 dynamic pressure sensor
31 condenser microphone
32 piezoelectric sensor
4 gas supply device
5 static pressure sensor
6 vacuum pump
7 temperature sensor
8 heating and cooling arrangement

What is claimed is:

1. A detector arrangement for energy measurement of pulsed x-ray radiation, particularly for monitoring the radiation dose of pulsed EUV radiation sources, comprising:

a closed vessel having an inlet opening for radiation to be detected;

said vessel being filled with a suitable gas under defined pressure for absorbing the radiation and having a linear extension, at least in the direction of incidence of the radiation, which is adapted to the absorption behavior of the gas so that the radiation to be detected is absorbed before it can reach a wall of the vessel; and at least one pressure sensor which is arranged in the vessel for measuring a pressure wave generated due to the local temperature change occurring as a result of temporary intensive radiation absorption.

2. The detector arrangement according to claim 1, wherein the gas in the vessel is adjusted with respect to type and density in such a way that the product of absorption coefficient, gas density and linear dimension of the gas vessel in the direction of incidence of the radiation is much greater than one so that the radiation to be measured is virtually completely absorbed in the exposed gas volume.

3. The detector arrangement according to claim 2, wherein the vessel has measuring devices for monitoring the gas density.

4. The detector arrangement according to claim 3, wherein a static pressure sensor and a temperature sensor are arranged in the vessel.

5. The detector arrangement according to claim 2, wherein an inert gas with an atomic number of Z>4 which favorably absorbs the radiation to be measured is provided as gas in the vessel.

6. The detector arrangement according to claim 5, wherein a noble gas is provided as gas.

7. The detector arrangement according to claim 5, wherein a gas mixture comprising gases with atomic numbers Z>4 is used as gas.

8. The detector arrangement according to claim 1, wherein acoustic sensors are provided as dynamic pressure sensors for energy measurement of the pressure wave generated by the absorption of radiation.

9. The detector arrangement according to claim 8, wherein one or more condenser microphones are provided as dynamic pressure sensors.

10. The detector arrangement according to claim 1, characterized in that one or more piezoelectric sensors are provided as dynamic pressure sensors.

11. The detector arrangement according to claim 1, wherein the dynamic pressure sensor is positioned in such a way that it is not directly struck by the radiation and preferably is arranged lateral to the direction of the radiation entering through the inlet opening.

12. The detector arrangement according to claim 1, wherein a gas supply device and a vacuum pump is provided for regular exchange of the gas to ensure identical conditions with respect to purity and density of the gas over long periods of time.

13. The detector arrangement according to claim 12, wherein xenon is provided in energy measurement of EUV radiation sources based on a gas discharge as gas for the energy absorption in the vessel and as work gas for plasma generation, wherein the gas pressure in the vessel is adjusted so as to be greater than the gas pressure in the discharge chamber of the EUV radiation source.

14. The detector arrangement according to claim 13, wherein the inlet opening of the vessel for the radiation is connected directly to the discharge chamber of the EUV radiation source by a connection flange and an inlet diaphragm unit limits the inlet opening in such a way that the xenon in the vessel is kept at a higher partial pressure relative to the discharge chamber by differential pumping and the vessel is a quasi-closed system.

* * * * *